UNITED STATES PATENT OFFICE.

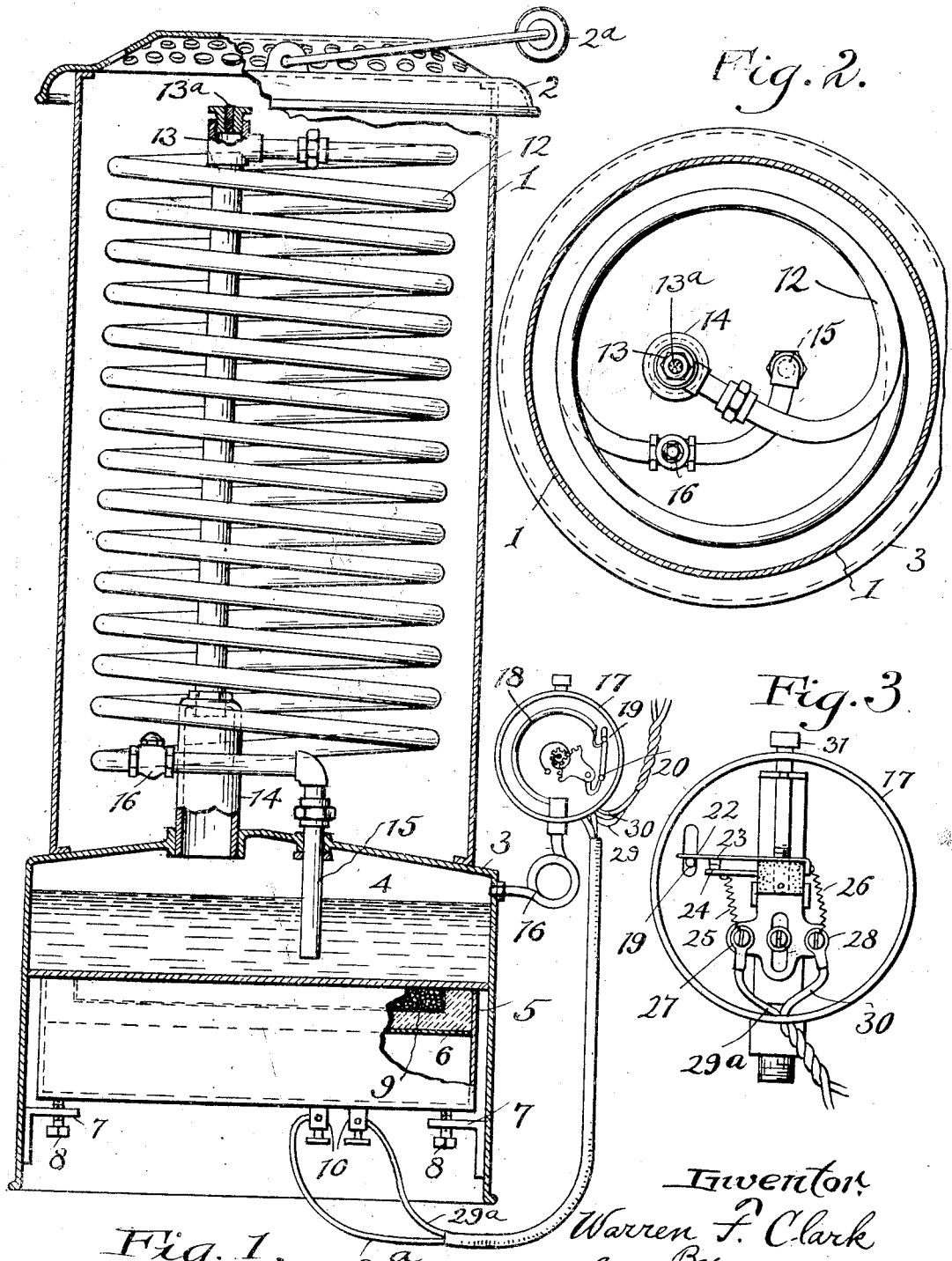

WARREN F. CLARK, OF CLEVELAND, OHIO, ASSIGNOR TO THE STEAM ELECTRIC PRODUCTS COMPANY, A CORPORATION OF OHIO.

HEATING DEVICE.

1,322,761.   Specification of Letters Patent.   Patented Nov. 25, 1919.

Application filed August 1, 1918. Serial No. 247,744.

*To all whom it may concern:*

Be it known that I, WARREN F. CLARK, a citizen of the United States, residing at Cleveland, in the county of Cuyahoga and State of Ohio, have invented a certain new and useful Improvement in Heating Devices, of which the following is a full, clear, and exact description.

This invention relates to a water heating device having a heating element arranged to heat the water in the device and provided with a control mechanism which automatically controls the functioning of the heating element in accordance with certain predetermined conditions which may be effected within the water heating device.

More particularly the disclosure herein embodies the invention in the form of a portable heat radiating device, in which the heat to be radiated is furnished by hot water or steam, held within a suitable container, in connection with an electrical heating element, the functioning of which is controlled by a regulator, which in turn is actuated in accordance with pressure conditions within the water or steam container.

Generally speaking the invention may be said to comprise elements and combinations thereof set forth in the accompanying claims.

Reference should be had to the accompanying drawings forming a part of the specification, in which Figure 1 is an elevation with portions in section showing my invention embodied in a portable heat radiating device; Fig. 2 is a top plan view of portions of the device shown in Fig. 1; Fig. 3 is an elevation with portions removed showing a part of the regulating device.

As before stated, I have chosen as a means for presenting my invention, an embodiment of the invention comprising a portable heat radiating device having a regulating device which automatically controls the functioning of a heating element in accordance with pressure conditions extant within the heat radiating device proper.

It will be apparent that the specific embodiment, which is about to be described, is but one of various forms in which the invention may be embodied, and, therefore, no limitation as to the embodiment of the invention is intended, except as clearly specified in the claims.

Referring to the drawings; 1 indicates a suitable casing, which is provided with a top portion 2. There is also a base portion generally indicated at 3, the upper part of the base portion 3 serving as a water container as indicated at 4. The lower part of the base portion has a part indicated at 5, which is adapted to receive a heating element 6. The heating element is supported by suitable brackets 7, carried by the base portion, and the heating element is maintained in connection with the lower surface or wall of the reservoir 4 by means of set-screws 8, which are threaded through the brackets 7.

The heating element in the embodiment shown is electrically energized, and without descending to detail of construction, because the particular construction of the heating element forms no part of the present invention, it may be said that the heating element at the top thereof, is made up of suitable resistance wires 9, embedded in suitable material which is non-conducting, both with respect to the electric current and with respect to heat. The terminals of the coil wires 9 are connected with the binding posts 10.

The top 2 may, if desired, be equipped with a bail such as indicated at 2ª, by which the heating device may be lifted and transported from place to place.

Within the casing 1 there is a coil of pipe 12. This coil of pipe is at one end connected with a suitable vertically extending pipe 13, the last mentioned pipe communicating with a fixture or steam chamber 14, which in turn is secured in the upper wall or top of the reservoir 4.

The lower end of the coil 12 is connected with a pipe 15, which also extends within the reservoir 4 to a point which is adjacent the lower portion of the reservoir.

In the coil 12, and preferably at the lower part of the coil, there is located a check valve 16, this being for the purpose of preventing steam or water from passing upward through the pipe 15 and to the coil, but permitting water that may accumulate in the coil 12 to pass the check valve on its return to the reservoir 4.

The pipe 13, at its upper end, is provided with a fusible plug 13ª. This plug is of suitable composition so that it may be fused and melted at a predetermined temperature, which temperature will be below the danger point, so that the plug will melt before the temperature would rise sufficiently high to cause explosion.

Communicating with the reservoir 4, at a place above the level of the water contained therein, is a conduit or pipe 16, which is in open communication with a regulator, which is generally indicated at 17.

This regulator comprises a flexible tube 18, which is a tube known as the Bourdon tube, the operation of which is very well understood.

This tube is connected with a pin 19, and the pin 19 is, by suitable mechanism generally indicated at 20, adapted for connecting with a dial such as is usually and commonly used with pressure indicating devices.

The pin 19 is adapted to engage with a flexible member 22, which carries a contact 23. This contact 23 engages with the contact 24. The members which carry the contacts 23 and 24 are so mounted as to be insulated from each other and the contact members are by the wires 25 and 26 connected with binding posts 27 and 28, these binding posts being adapted to receive wires 29 and 30.

The wires 29 and 30 are connected with a source of supply which is not shown and continuations of the wires 29 and 30, as indicated at 29ª and 30ª, are connected with the binding posts 10 of the heating element. The wires 30 and 29ª are connected with binding posts 27 and 28, while the wires 29 and 30ª are directly connected within the regulator 17. The contact members 23 and 24 are so to speak, electrically inserted in one side of the circuit represented by the wires 29 and 30, so that when the contacts 23 and 24 are separated the circuit to the heating element is broken and thereby the supply of current stopped.

As is well understood, one end of the Bourdon tube 18 is in communication with the pipe 16 and the Bourdon tube 18 is moved to a greater or less degree in accordance with the pressure existing within the reservoir 4 above the water level. As this pressure increases the movement of the Bourdon tube will cause member 19 to be raised and when raised a sufficient amount will move the contacts 23 and 24 away from each other. The amount of pressure on the part of the member 19 to effect the movement of the contact member 23 may be regulated by the pressure of the thumb-screw 31 upon the member 22.

The operation of the device is as follows: a suitable quantity of water is introduced into the reservoir 4, the level of the water being below the orifice of the tube 16. Under these conditions, there being no pressure above atmospheric pressure, existing in the reservoir 4, the contact members 23 and 24 are together, so that when the wires 29 and 30 are connected with the source of current the heating element 6 will be energized and supply heat to the water 4. This heating continues and steam will utimately be formed. This steam will pass through the member 14, thence through vertical pipe 13 and through the coil 12. As the steam passes through the coil 12 it will more or less condense and the water thus formed will flow through the coil 12 past the check valve 16 and reënter the reservoir 4 through the pipe 15.

As the heating is continued by the heating element, and the generation of steam continues, a pressure above atmospheric pressure will be built up in the upper portion of reservoir 4 and that pressure acting on the Bourdon tube will, when the pressure is built up sufficiently, cause the contacts 23 and 24 to be parted and the circuit to the electric heating element broken. This then automatically stops the functioning of the heating element.

As long as the predetermined pressure exists within the upper part of the reservoir 4 the circuit to the heating element is held open and obviously as soon as the pressure diminishes below a certain point the contact members 23 and 24 will again come together, reëstablishing the circuit to the heating element, and thus again cause the application of heat to the water in reservoir 4.

It will thus be apparent that the control of the device is entirely automatic and that the regulator may be adjusted so as to cause the heating element to cease functioning in accordance with predetermined pressure contacts within the device.

Having described my invention, I claim.

1. In a device of the character described, the combination with a water containing reservoir, heat radiating members mounted upon the reservoir, and in open communication with the interior thereof, a heating device for heating the reservoir, a regulator having communication with the water containing reservoir, and responsive to pressure conditions therein, said regulator being operatively connected to the heating device to control the functioning thereof, and a casing supported by the base and including the heat radiating members, the regulator being supported without said casing.

2. In a device of the character described, the combination with a water containing reservoir, a coil of pipe connected at both its ends with said reservoir, a casing mounted upon the base and inclosing the said coil, a heating device for heating the reservoir, a regulator mounted outside of the casing and having a connection which extends through the casing into communication with the water containing reservoir, said regulator being responsive to pressure conditions within the reservoir, the said regulator being operatively connected with the heating device to control the functioning thereof.

3. In a device of the character described, the combination with a water containing reservoir, heat radiating members mounted upon said reservoir, and in open communication with the interior thereof, the said reservoir being provided with a recess on the under side thereof, and an electric heating element mounted within the said recess, a regulating device having communication with the water containing reservoir and responsive to pressure conditions therein, said regulator being operatively connected with the electric heating device to control the functioning thereof.

4. In a device of the character described, the combination with a water containing reservoir, a hollow heat radiating member in open communication with the reservoir, said reservoir being provided with a recess upon the under side thereof, an electric heating element occupying said recess, a casing mounted upon the said casing and inclosing the said heat radiating member, a regulator positioned outside of the casing, a connection between the said reservoir and the regulator, which extends through the casing, said regulator being responsive to pressure conditions within the reservoir, said regulator being operatively connected with the electric heating device to control the functioning thereof.

5. In a device of the character described, the combination with a water reservoir, a hollow heat radiating member mounted upon the reservoir and in open communication therewith, said reservoir being provided with a recess upon the underside thereof, an electric heating element occupying said recess, a casing mounted upon the reservoir and inclosing the heat radiating member, a casing mounted outside of the first mentioned casing, a Bourdon tube within the last mentioned casing, a connection between the said Bourdon tube, and the interior of the reservoir, contact members associated with the Bourdon tube, said contact members being electrically connected with the aforesaid heating element, whereby the functioning of the heating element is controlled by the Bourdon tube.

6. In a device of the character described, the combination with a reservoir, a pipe extending substantially vertical from said reservoir, a coil of pipe, one end of the coil being connected with the end of the vertical pipe, the other end of the coil extending within the reservoir, an electric heating device located beneath the reservoir and in contact with a wall of said reservoir.

7. In a device of the character described, the combination with a reservoir, an upwardly extending pipe connected with the reservoir, a coil of pipe having one end connected with the upwardly extending pipe and the other end communicating with the interior of the reservoir, a heating element coöperating with the reservoir, a casing supported by the base.

8. A portable heating device comprising a base part, which includes a water containing reservoir, a heating element associated with the reservoir and means for supporting the heating element, a casing mounted upon the base portion, a pipe coil within said casing, the opposite ends of said pipe coil being in communication with the interior of the reservoir.

In testimony whereof, I hereunto affix my signature.

WARREN F. CLARK.